(12) United States Patent
Pelegri-Llopart et al.

(10) Patent No.: US 6,961,929 B1
(45) Date of Patent: Nov. 1, 2005

(54) MECHANISM FOR AUTOMATIC SYNCHRONIZATION OF SCRIPTING VARIABLES

(75) Inventors: Eduardo Pelegri-Llopart, Menlo Park, CA (US); Laurence P.G. Cable, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/471,072

(22) Filed: Dec. 21, 1999

Related U.S. Application Data

(60) Provisional application No. 60/141,071, filed on Jun. 25, 1999, provisional application No. 60/149,508, filed on Aug. 17, 1999.

(51) Int. Cl.[7] .............................. G06F 9/45; G06F 9/44
(52) U.S. Cl. ...................................... 717/136; 717/115
(58) Field of Search .................... 717/115, 116, 118, 717/139, 162–7, 136; 709/330

(56) References Cited

U.S. PATENT DOCUMENTS 5,961,586 A * 10/1999 Pedersen ..................... 709/330
6,125,402 A *  9/2000 Nagarajayya et al. ....... 709/330

OTHER PUBLICATIONS

"Getting Started with ColdFusion," [online] Oct. 2, 1998 [accessed Sep. 24, 2002], Allaire Corporation, part of "ColdFusion Documentation", Retrieved from Internet <URL: http://www.macromedia.com/v1/documents/cf4/dochome.htm>, pp. 1-5.*

"Developing Web Applications with ColdFusion," [online] Oct. 2, 1998 [accessed Sep. 24, 2002], Allaire Corporation, part of "ColdFusion Documentation", Retrieved from Internet<URL: http://www.macromedia.com/v1/documents/cf4/dochome.htm>, pp. 1-44.*

"Advanced ColdFusion Development," [online] Oct. 2, 1998 [accessed Sep. 24, 2002], Allaire Corporation, part of "ColdFusion Documentation", Retrieved from Internet <URL: http://www.macromedia.com/v1/documents/cf4/dochome.htm>, pp. 1-39.*

"ColdFusion 4.0 Documentation Update," [online] Oct. 2, 1998 [accessed Sep. 24, 2002], Allaire Corporation, part of "ColdFusion Documentation", Retrieved from Internet <URl: http://www.macromedia.com/v1/documents/cf4/dochome.htm>, pp. 1-4.*

(Continued)

*Primary Examiner*—Todd Ingberg
*Assistant Examiner*—Eric B. Kiss
(74) *Attorney, Agent, or Firm*—Beyer Weaver & Thomas, LLP

(57) ABSTRACT

The present invention defines a mechanism for automatic synchronization of scripting variables in an action tag extension facility. Attached to each action, there is a TagExtraInfo class that describes the action. The TagExtraInfo class knows the attributes of the class, including the names of the scripting variables introduced or modified by the action. At translation time, a tag handler accesses the information from the TagExtraInfo class for each tag in a page. At run time, a pageContext object is created containing a mapping of scripting variables to values. The values are visible to the scripting code, and the scripting code can modify the values. Also, the values are accessible by the action code. The action code can modify the values or create new values and assign the values to scripting variables so that the scripting code can modify them later. Thus, the present invention allows action tags to be created without explicit knowledge of the scripting language used to create a page.

12 Claims, 4 Drawing Sheets

OTHER PUBLICATIONS

"ColdFusion Quick Reference Guide," [online] Oct. 2, 1998 [accessed Sep. 24, 2002], Allaire Corporation, part of "ColdFusion Documentation", Retrieved from Internet <URL: http://www.macromedia.com/v1/documents/cf4/dochome.htm>, pp. i-iv, 1-30.*

Colton, Paul, et al., "Tools for Developing Servlets and Server Pages Using Java Technology," 1999, JavaOne '99 Session Information, pp. 1-17.*

Pelegri-Llopart, Eduardo, "JavaServer Pages Technology," 1999, JavaOne '99 Session Information, pp. 1-36.*

"Java[tm] Technology Overview," [online] 2002 [accessed Sep. 23, 2002], Sun Microsystems, Retrieved from Internet <URL: http://wwws.sun.com/software/java/overview.html>, p. 1.*

"Extensible Markup Language (XML) 1.0," [online] Feb. 10, 1998 [accessed Sep. 25, 2002], W3C, REC-xml-19980210, Retrieved from Internet <URL: http://www.w3.org/TR/1998/REC-xml-19980210.pdf>, pp. i-iv, 1-32.*

* cited by examiner

MECHANISM FOR AUTOMATIC SYNCHRONIZATION OF SCRIPTING VARIABLES

This application claims priority from U.S. Provisional Application No. 60/141,071, filed Jun. 25, 1999, entitled "JAVASERVER™ PAGES SPECIFICATION," and from U.S. Provisional Application No. 60/149,508, filed Aug. 17, 1999, entitled "JAVASERVER™ PAGES SPECIFICATION." The present application is related to U.S. patent application Ser. No. 09/467,387, entitled "MULTI-LINGUAL TAG EXTENSION MECHANISM", filed Dec. 21, 1999; the applications are commonly assigned to the assignee of the present invention, and the disclosures of which are herein incorporated by reference.

BACKGROUND OF THE INVENTION

1. Field of the Invention

The present invention relates generally to the field of computer software, and more particularly to a mechanism for automatic synchronization of scripting variables in a tag extension facility suitable for JAVASERVER™ Pages.

2. Description of the Related Art

JAVASERVER™ Pages is the JAVA™ programming language platform technology (hereinafter JAVA™ platform) for building applications containing dynamic Web content such as HTML, DHTML, XHTML, and XML. A JAVASERVER™ Page (JSP) is a text-based document that describes how to process a request to create a response. The description inter-mixes template data with some dynamic actions, taking advantage of the capabilities of the JAVA™ platform. The template data is commonly fragments of a structured document (HTML, DHTML, XHTML or XML), and the dynamic actions can be described with scripting elements and/or server-side action tags.

A simple example of a JSP page is shown in FIG. 2. The example shows the response page, which is intended to be a short list of the day of the month and year, at the moment the request is received by the server. The page itself contains some fixed template text, and JSP elements that are shown underlined in the figure. The underlined actions are executed on the server side. When a client makes a request, such as an HTTP request, a request object requests a response from the JAVASERVER™ container object. The first element creates a JAVA™ Bean component named clock, of type calendar.jspCalendar. The next two elements use the JAVA™ Bean component to display some of its properties (i.e. month and year). The output is sent to a response object which sends a response back to the client.

A JSP page is executed by a JSP container, which is installed on a Web server, or on a Web enabled application server. The JSP container delivers requests from a client to a JSP page and responses from the JSP page to the client. JSP pages may be implemented using a JSP translation or compilation phase that is performed only once, followed by a request processing phase that is performed once per request. The translation phase creates a JSP page implementation class that implements a servlet interface.

Typically, a JSP page contains declarations, fixed template data, action instances that may be nested, and scripting elements. When a request is delivered to a JSP page, all these components are used to create a response object that is then returned to the client. As with standard Web pages, JSP pages may contain "tags." A tag is a textual element within a document that provides instructions for formatting or other actions. For example, World Wide Web documents are set up using HTML (Hyper-Text Mark-up Language) tags which serve various functions such as controlling the styling of text and placement of graphic elements, and also providing links to interactive programs and scripts.

In standard implementations, a JSP page is translated into JAVA™ programming language code (hereinafter JAVA™ code) that runs on a server. The transformation from the JSP page into JAVA™ code is done once, when the page is first accessed. The JAVA™ code running on the server is activated when a request is received. In order to create a response object, certain data is passed verbatim to the response, and some actions are executed on the server side. Some of these actions are explicitly spelled out in the JSP page, and other actions are described by the semantics of the text. Thus, there are three types of code: verbatim code, scripting code from the JSP page, and code which has to be defined by the tag library. As used herein, "tags" in the JSP context will be referred to as "actions."

Ideally, a tag mechanism employed in a JSP page system would allow for actions to be defined in standard libraries. This would allow third parties to provide new actions as part of their JSP authoring tools. For example, as shown in FIG. 3, a JSP page author may use a JSP specification-compliant authoring tool to create a Web page. The vendor of the authoring tool can provide new actions via a JSP tag library, such as a tag library that supports chat room functionality. The page can then be deployed into any JSP-compliant container, such as a Web browser. The Web browser uses the same tag library information in order to run the Web page, including the desired chat room functions.

In other words, if a standard JSP tag mechanism is properly defined, vendors of tag libraries can use the standard specification to create tag libraries that are compliant with the JSP environment. Also, vendors of authoring tools can create authoring tools (and scripting languages) compliant with the specification, and vendors of Web browsers can create JSP compliant Web browsers. A Web page author can then choose the best tag library and the best authoring tool available for creating the desired Web pages. Two different Web browsers may support scripting in a completely different manner, but the same tag libraries must be supported by both in order to run the Web page.

In a JSP page, there are objects that are created at execution time, which can be associated with variables in the scripting language. The tag extensions can be invoked from the main JSP page and may update the objects, or create new ones. When creating a new object, the tag extension may need to provide the new object to the JSP page, and associate the object with a scripting variable. However, the tag extensions and the scripting page may be defined in different languages. Thus, there is a need to define a mechanism such that the scripting variables can be passed between the JSP container and the tag extension mechanism and updated automatically (i.e. the variables can be synchronized).

Certain prior extension mechanisms rely on explicit manipulation of the variable to object mapping (i.e. a context). This context is available to both the extension mechanism and to the scripting elements in the JSP page, either directly in the language or through explicit method calls. Other extension mechanisms are mono-lingual and assume that the context is known to both the extension mechanism and the scripting elements in the JSP page. Both approaches are too restrictive, however. Preferably, an implementation would provide greater flexibility for allowing different, compatible scripting languages to work with the tag extension mechanism.

SUMMARY OF THE INVENTION

The present invention defines a mechanism for automatic synchronization of scripting variables in an action tag extension facility. This allows custom actions to create and modify variables, while still allowing the variables to be visible to the scripting language. The values are visible to the scripting code, and the scripting code can modify the values. Also, the values are accessible by the action code. The action code can modify the values or create new values and assign the values to scripting variables so that the scripting code can modify them later.

Attached to each action, there is a TagExtraInfo class that describes the action. The TagExtraInfo method will return at translation time an array of objects that describe the run-time effect of the action. Each object contains a name of each variable as a valid JAVA™ programming language object (hereinafter JAVA™ object), a JAVA™ programming language type (hereinafter JAVA™ type) of each variable, and a scope parameter which defines a variable's scope with the page and indicates whether the variable is new or pre-existing. At translation-time, the JSP page is translated into a servlet class. In the process of translation, the translator asks for the list of scripting variables from TagExtraInfo object for a given action. If a new variable has been defined, the translator may need to provide a new declaration statement. At run time, the action tag handler references a pageContext object, which provides key values for specified variable names. The pageContext object points to an object associated with a given variable name and is created when the page is executed, thereby associating a variable with a value.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a mechanism for automatic synchronization of scripting variables in a tag extension facility for JAVASERVER™ Pages.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Figure 1:
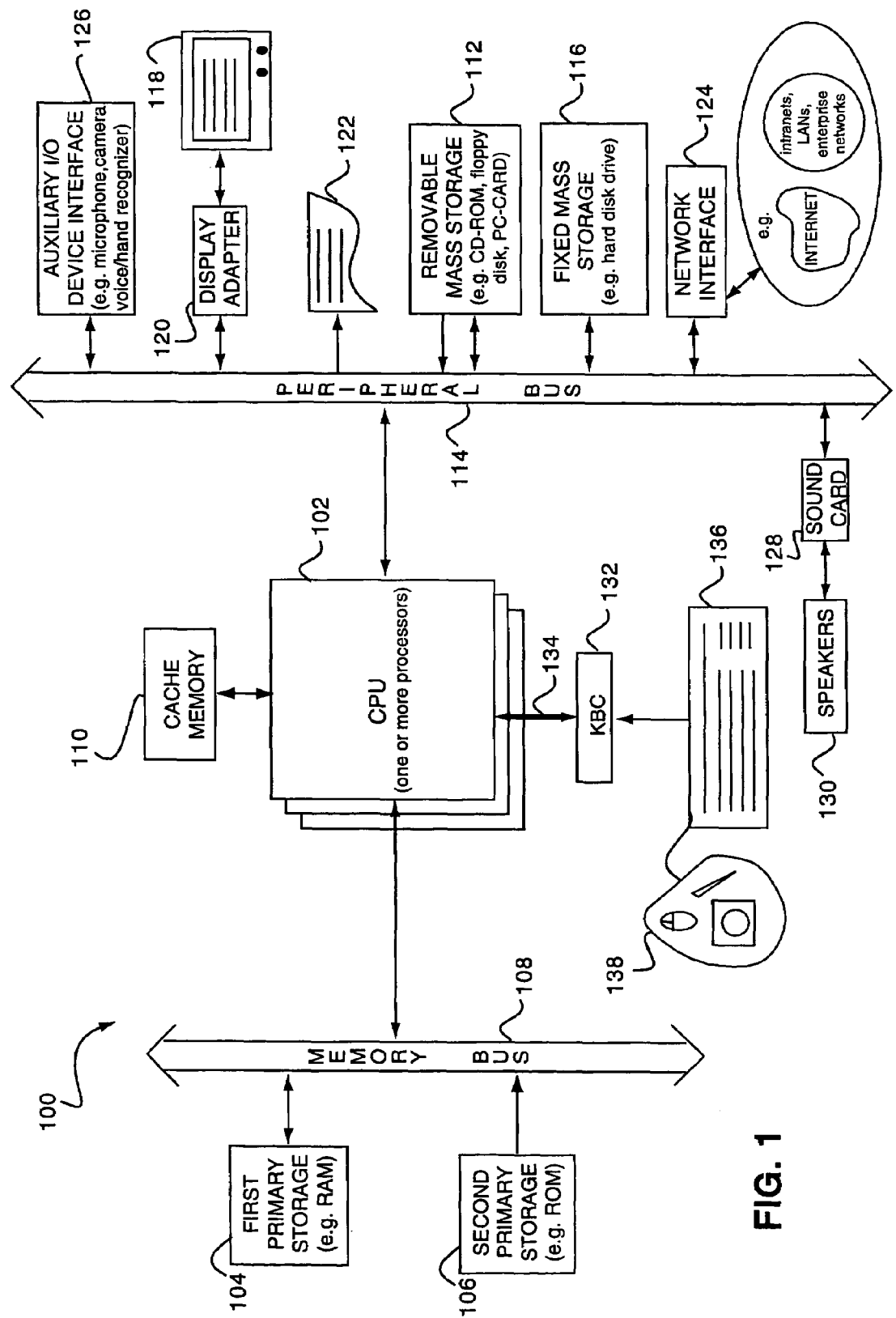
FIG. 1 is a block diagram of a computer system suitable for implementing the present invention.
Figure 2:
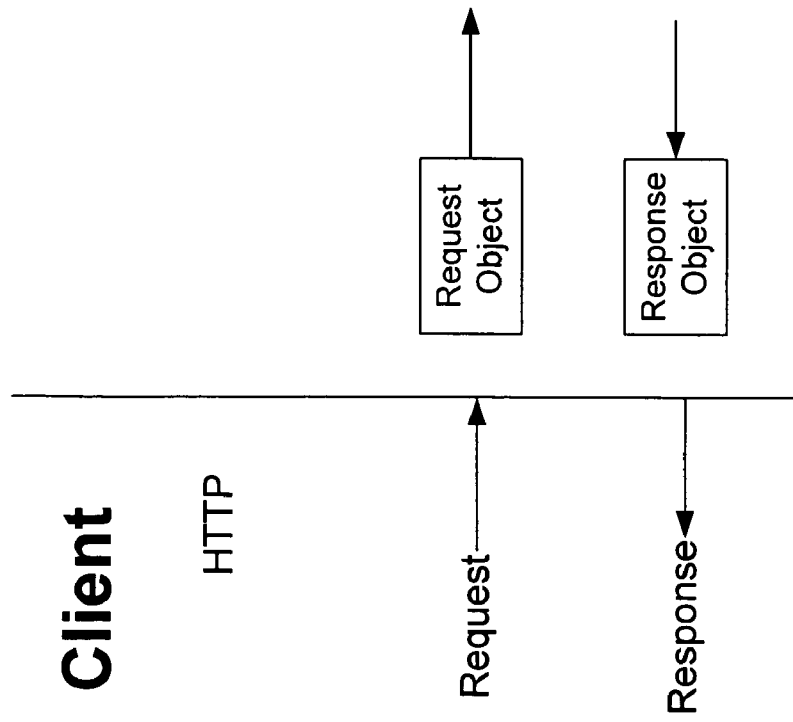
FIG. 2 illustrates a JSP page.
Figure 3:
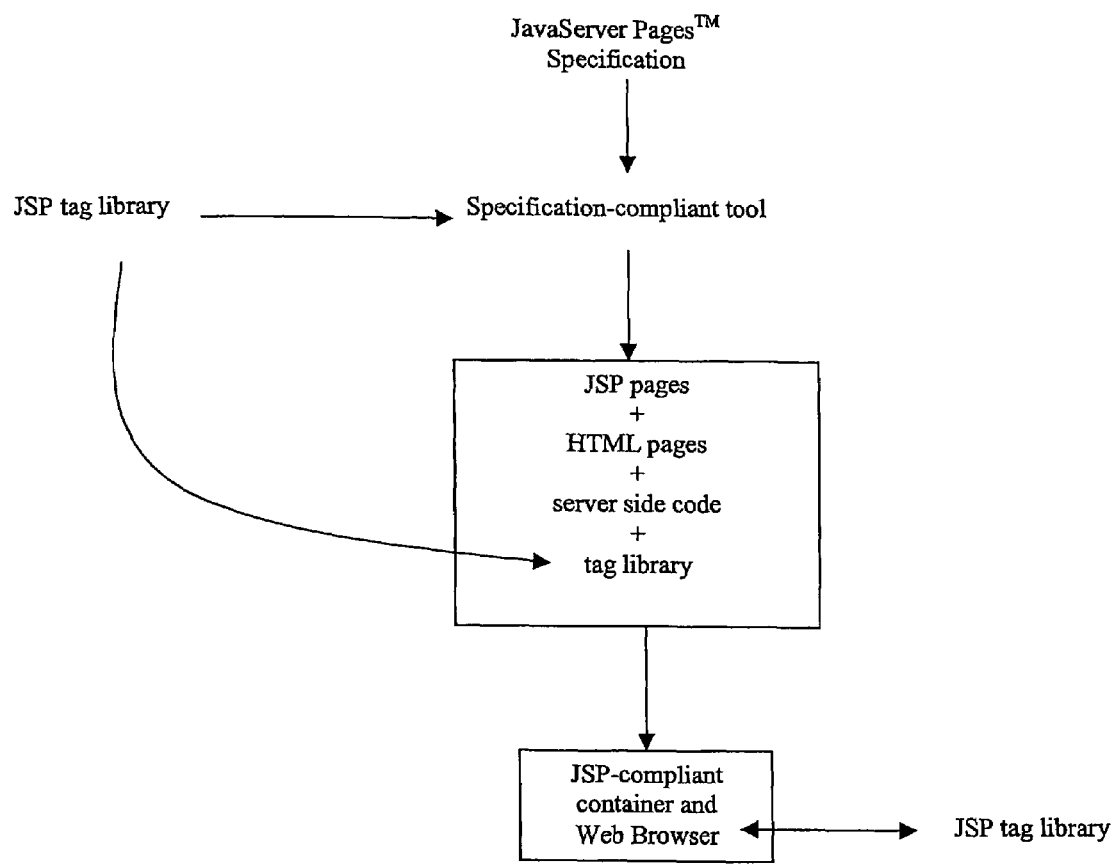
FIG. 3 is a diagram illustrating the relationship between a tag library, a JSP page, and a Web browser.

FIG. 1 is a block diagram of a general purpose computer system 100 suitable for carrying out the processing in accordance with one embodiment of the present invention. FIG. 1 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. It should be noted that in re-configurable computing systems, CPU 102 can be distributed amongst a group of programmable logic devices. In such a system, the programmable logic devices can be reconfigured as needed to control the operation of computer system 100. In this way, the manipulation of input data is distributed amongst the group of programmable logic devices. CPU 102 is a general purpose digital processor which controls the operation of the computer system 100. Using instructions retrieved from memory, the CPU 102 controls the reception and manipulation of input data, and the output and display of data on output devices.

CPU 102 is coupled bi-directionally with a first primary storage 104, typically a random access memory (RAM), and uni-directionally with a second primary storage area 106, typically a read-only memory (ROM), via a memory bus 108. As is well known in the art, primary storage 104 can be used as a general storage area and as scratch-pad memory, and can also be used to store input data and processed data. It can also store programming instructions and data, in the form of data objects, in addition to other data and instructions for processes operating on CPU 102, and is used typically used for fast transfer of data and instructions in a bi-directional manner over the memory bus 108. Also as well known in the art, primary storage 106 typically includes basic operating instructions, program code, data and objects used by the CPU 102 to perform its functions. Primary storage devices 104 and 106 may include any suitable computer-readable storage media, described below, depending on whether, for example, data access needs to be bi-directional or uni-directional. CPU 102 can also directly and very rapidly retrieve and store frequently needed data in a cache memory 110.

A removable mass storage device 112 provides additional data storage capacity for the computer system 100, and is coupled either bi-directionally or uni-directionally to CPU 102 via a peripheral bus 114. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 116 also provides additional data storage capacity and is coupled bi-directionally to CPU 102 via peripheral bus 114. The most common example of mass storage 116 is a hard disk drive. Generally, access to these media is slower than access to primary storages 104 and 106.

Mass storage 112 and 116 generally store additional programming instructions, data, and the like that typically are not in active use by the CPU 102. It will be appreciated that the information retained within mass storage 112 and 116 may be incorporated, if needed, in standard fashion as part of primary storage 104 (e.g. RAM) as virtual memory.

In addition to providing CPU 102 access to storage subsystems, the peripheral bus 114 is used to provide access other subsystems and devices as well. In the described embodiment, these include a display monitor 118 and adapter 120, a printer device 122, a network interface 124, an auxiliary input/output device interface 126, a sound card 128 and speakers 130, and other subsystems as needed.

The network interface 124 allows CPU 102 to be coupled to another computer, computer network, or telecommunications network using a network connection as shown. Through the network interface 124, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 124.

Auxiliary I/O device interface 126 represents general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 102 is a keyboard controller 132 via a local bus 134 for receiving input from a keyboard 136 or a pointer device 138, and sending decoded symbols from the keyboard 136 or pointer device 138 to the CPU 102. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 108, peripheral bus 114, and local bus 134 are illustrative of any interconnection scheme serving to link the subsystems. For example, a local bus could be used to connect the CPU to fixed mass storage 116 and display adapter 120. The computer system shown in FIG. 1 is but an example of a computer system suitable for use with the invention. Other computer architectures having different configurations of subsystems may also be utilized.

As the term is used herein, a tag extension mechanism is a specialized sub-language that enables the addition of new or custom actions, thus allowing the JSP "language" to be easily extended in a portable fashion. A typical example would be elements to support embedded database queries. Tag libraries can be used by JSP authors or JSP authoring tools and can be distributed along with JSP pages to any JSP container (i.e. JSP environment and/or engine), such as Web and application servers. The tag extension mechanism of the present invention can be used from JSP pages written using any valid scripting language, although the mechanism itself only assumes a JAVA™ programming language RunTime environment.

Figure 4:
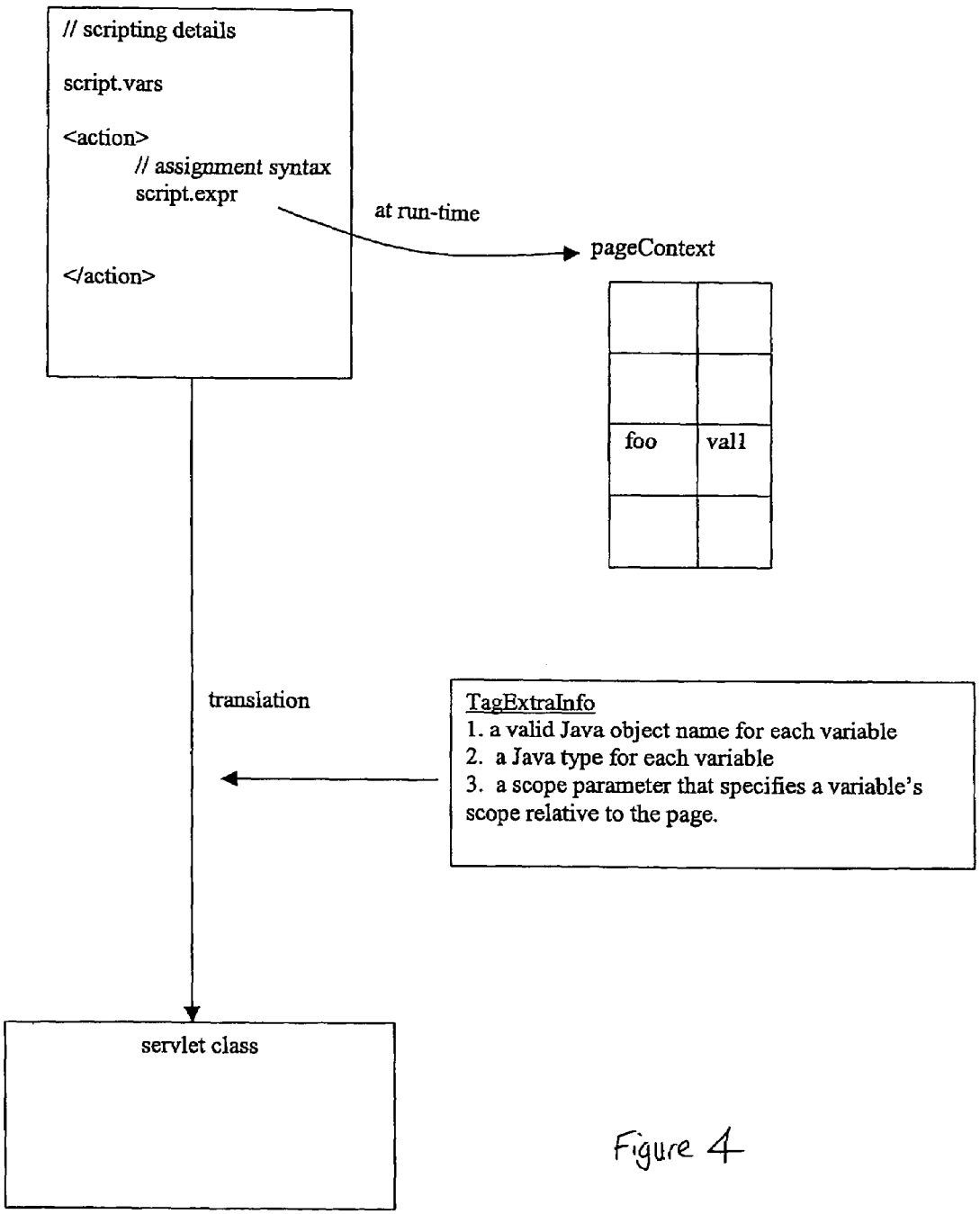
FIG. 4 is a block diagram illustrating the components of the present invention.

As shown in FIG. 4, a JSP page, many contain scripting variables and actions (tags). These actions or tags can define new scripting variables or update existing variables. The present invention defines a mechanism that allows the actions to create and modify objects, while still allowing the objects to be visible to the scripting language. The values are visible to the scripting code, and the scripting code can modify the values. Also, the values are accessible by the action code. The action code can modify the values or create new values and assign the values to scripting variables so that the scripting code can modify them later.

A tag library constructed according to the present invention is a collection of available action tags. A tag library includes a tag library descriptor (TLD). For each tag, the tag library descriptor includes a tag handler class (i.e. a request time object of the tag), and an optional TagExtraInfo class. Thus, attached to each action, there is a TagExtraInfo class that describes the action. The TagExtraInfo class knows the attributes of the class, including the names of the scripting variables introduced or modified by the action. In other words, the TagExtraInfo class maintains a list of variables defined or changed in an action. More specifically, the TagExtraInfo method will return at translation time an array of objects that describe the run-time effect of the action. Each object contains a name of each variable as a valid JAVA™ object, a JAVA™ type of each variable, and a scope parameter which defines a variable's scope with the page and indicates whether the variable is new or pre-existing.

At translation-time, the JSP page is translated into a servlet class. In the process of translation, the translator asks for the list of scripting variables from TagExtraInfo object for a given action. If a new variable has been defined, the translator may need to provide a new declaration statement. At run time, the action tag handler references a pageContext object, which provides key values for specified variable names. The pageContext object points to an object associated with a given variable name and is created when the page is executed, thereby associating a variable with a value.

The scripting details of the JSP page are only known by the translator, and the translator is the only component that knows how to define new scripting variables and how to assign them. The translator generates code that will access the page context object, according to some contract. The contract is described by a combination of specification-defined conventions plus the information provided by the TagExtraInfo object. At run time, the code generated by the translator will look for the name of a variable (i.e. "foo") and assign its value to the scripting variable.

As described above, the JSP container (translator) knows the details of the scripting language of the page, whereas the author of the action tag is unaware of which scripting language will be used. So in order to provide for maximum flexibility and portability, the present invention provides a mechanism that insulates the tag implementation (tag mechanism) from the scripting language details. If both the tag library and the scripting page were written in the same language, such as the JAVA™ programming language, the variables could be synchronized more easily. However, in order to provide a more general solution, the present invention exposes the variables in an action tag at translation time via the TagExtraInfo class, and uses a pageContext object to map the variables to values at run time.

Thus, by having a description of the names and types of the scripting variables provided by the tag library, the JSP container is not limited to any particular scripting language or specific scripting language implementation. The key idea is to combine an explicit run-time representation of the context with the translation-time information of the scripting variables affected. The tag extension uses the run-time context to modify and/or create objects. The main JSP page uses the translation-time information to automatically synchronize the scripting variables whenever the main JSP page code is accessed. In other words, the TagExtraInfo object knows which variables are going to be modified, and the scripting language knows how to do the modification. By providing a mechanism for the tag library and the JSP container to share this information, the present invention facilitates the use of many different scripting languages for JSP pages and provides the addition of many new action tags from various vendors.

In one embodiment, the JSP page implementation instantiates (or reuses) a tag handler object for each action in the JSP page. This handler object is a JAVA™ object that implements the javax.servlet.jsp.tagext.Tag interface. The tag handler then passes in the values for the variables to a pageContext object. The pageContext object encapsulates implementation dependent features and provides convenience methods, such as getter methods to obtain references to various request-time objects. The pageContext object also provides access to all the implicit objects (including the request object, for instance) to the handler.

When a custom tag introduces some new identifiers, a javax.servlet.jsp.tagext.TagExtraInfo object is involved at JSP translation time (not at request-time). This object indicates the names and types of the scripting variables that will be assigned objects (at request time) by the action. The only responsibility of the tag author is to indicate this information in the TagExtraInfo object. The corresponding Tag object must add the objects to the pageContext object. It is the responsibility of the JSP translator to automatically supply all the required code to do the "synchronization" between the pageObject values and the scripting variables.

An action tag can define one or more objects, and an id attribute may be used to describe the "main" object (if any) defined by the tag. The scope attribute can be used to describe where to introduce the object. The pageContext interface is used to access and modify the scope data.

In a tag of the form:
<foo attr="one" attr2="two">
   body
</foo>

The action foo may define some scripting variables that are available within a body; and it may also define some scripting variables that are defined after the end of the action tag. The defined variables are inserted into the pageContext object and are available through the pageContext object to the code that implements other tags.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A computer system for automatic synchronization of scripting variables between a page including action tags and a tag library, the computer system comprising:

a page suitable for building an application with dynamic web content, the page including one or more action tags that are provided as text in a mark-up language;

a tag library;

a translator suitable for translating the action tags from the mark-up language to an executable programming code that is executed at runtime to perform actions intended by the action tags;

a TagExtraInfo object for each action tag in the page, the TagExtraInfo object providing a method that is accessed by the translator at translation time, the method returning, at translation time, information that includes a list of available scripting variables, and a variable type and scope associated with each scripting variable that is defined or modified by its associated action tag, thereby allowing the translator at translation time to use the information provided by the method to generate code that when executed at runtime will assign each of the scripting variables with appropriate runtime values with respect to the type and scope of each of the scripting variables;

a pageContext object for the page, the pageContext object including a runtime mapping of at least one scripting variable in the list of available scripting variables to a runtime value that is represented or can be represented in the tag library, a tag handler that creates at runtime one or more objects that the page requires, the tag handler further operating to store the one or more created objects into the pageContext object; thereby allowing the one or more objects to be retrieved at runtime when the generated code is executed, the one or more objects being assigned at runtime to each of the scripting variables in the list of scripting variables that is returned by the method at translation time.

2. The computer system of claim 1, wherein the TagExtraInfo object comprises:
  a valid object name for each variable;
  a type for each variable; and
  a scope parameter that specifies a variable's scope relative to the page.

3. The computer system of claim 1, wherein the page is executed on a server that implements a container, and the page is converted to a platform independent code that is executed on the server.

4. A computer system as recited in claim 1, wherein the page is converted to a first programming code which is different than a second programming code that is used to implement the tag library.

5. A method for automatically synchronizing scripting variable between a page including one or more action tags and a tag library, the page suitable for building an application with dynamic web content, the one or more action tags being provided as text in a mark-up language which are translated at translation time to an executable code that is executed at runtime to synchronize the scripting variables at runtime, the method comprising:
  instantiating, by a translator at translation time, for each action tag a TagExtraInfo object, the TagExtraInfo object providing a method that is accessed by the translator at translation time, the method capable of returning at translation time information that includes a list of available scripting variables and respectively associated variable types and scopes for each of the scripting variables in the list of available scripting variables, each of the scripting variables being defined or modified by an associated action tag;
  invoking the method by a translator at translation time, wherein the invoking operates to pass a list of attributes associated with the one or more action tags;
  receiving, as a result of the invoking of the method, a collection of returned TagExtraInfo objects, wherein each of the returned TagExtraInfo objects includes an available scripting variable, its variable type, and its scope in the page;
  generating by the translator, based on the returned TagExtraInfo objects, executable code that is executed at runtime, wherein the executable code accesses at runtime data that will be stored in a pageContext object at runtime, the runtime data including appropriate runtime values for each of the available scripting variables;
  storing at runtime, into the pageContext object, by a tag handler at runtime, one or more objects that the page requires, thereby allowing the objects for the one or more objects to be retrieved at runtime and be assigned at runtime to the list of scripting variables; and
  executing, at run time, the code generated by the translator to assign appropriate runtime values which are stored in the pageContext object to each of the scripting variables in the returned TagExtraInfo objects, thereby allowing the runtime values to be retrieved and assigned at runtime to each of the available scripting variables in the collection of returned TagExtraInfo objects.

6. The method of claim 5, wherein the TagExtraInfo object comprises:
  a valid object name for each variable;
  a type for each variable; and
  a scope parameter that specifies a variable's scope relative to the page.

7. The method of claim 5, wherein the page is executed on a server that implements a container, and the page is converted to platform independent code that is executed on the server.

8. A method as recited in claim 5, wherein the page is written in a first programming code which is different than a second programming code that is used to implement the tag library.

9. A computer readable media including computer program code for automatically synchronizing scripting variables between a page including one or more action tags and a tag library, the computer readable media comprising:
  computer program code for a page suitable for building an application with dynamic web content, the page including one or more action tags that are provided as text in a mark-up language;
  computer program code for a tag library;
  computer program code for a translator suitable for translating the action tags from the mark-up language to an executable programming code that is executed at runtime to perform actions intended by the action tags;
  computer program code for a TagExtraInfo object for each action tag in the page, the TagExtraInfo object providing a method that is accessed by the translator at translation time, the method returning, at translation time, information including a list of available scripting variables, and a variable type and scope associated with each scripting variable that is defined or modified by its associated action tag; thereby allowing the translator, at translation time, to use the list to generate code that when executed at runtime will assign each of the scripting variables with appropriate runtime values with respect to the type and scope of each of the scripting variables;
  computer program code for a pageContext object for the page, the pageContext object including a runtime mapping of at least one scripting variable in the list of available scripting variables to a runtime value that is represented or can be represented in the tag library; and
  computer program code for a tag handler that creates at runtime one or more objects that the page requires, the tag handler further operating to store the one or more created objects into the pageContext object, thereby allowing the one or more objects to be retrieved at runtime when the code is executed, and the one ore more objects being assigned at runtime to each of the scripting variables in the list of scripting variables that was returned by the method at translation time.

10. A computer readable medium as recited in claim 9, wherein the TagExtraInfo object comprises:
  a valid object name for each variable;
  a type for each variable; and
  a scope parameter that specifies a variable's scope relative to the page.

11. A computer readable medium as recited in claim 9, wherein the page is converted to a first programming code which is different than a second programming code that is used to implement the tag library.

12. A computer readable medium as recited in claim 9, wherein the page is executed on a server that implements a container, and the page is converted to a platform independent code that is executed on the server.

* * * * *